United States Patent
Jain et al.

(10) Patent No.: US 11,899,520 B2
(45) Date of Patent: Feb. 13, 2024

(54) DYNAMIC CACHE BYPASS FOR POWER SAVINGS

(71) Applicants: Advanced Micro Devices, Inc., Santa Clara, CA (US); ATI Technologies ULC, Markham (CA)

(72) Inventors: Ashish Jain, Austin, TX (US); Benjamin Tsien, Santa Clara, CA (US); Chintan S. Patel, Santa Clara, CA (US); Vydhyanathan Kalyanasundharam, Santa Clara, CA (US); Shang Yang, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/730,041

(22) Filed: Apr. 26, 2022

(65) Prior Publication Data
US 2023/0341922 A1    Oct. 26, 2023

(51) Int. Cl.
*G06F 1/32*      (2019.01)
*G06F 1/3287*    (2019.01)
*G06F 1/3234*    (2019.01)
*G06F 12/0891*   (2016.01)

(52) U.S. Cl.
CPC .......... *G06F 1/3287* (2013.01); *G06F 1/3275* (2013.01); *G06F 12/0891* (2013.01); *G06F 2212/1021* (2013.01); *G06F 2212/1028* (2013.01)

(58) Field of Classification Search
CPC .............................. G06F 1/3287; G06F 1/3275
See application file for complete search history.

(56) References Cited

U.S. PATENT DOCUMENTS

| | | | |
|---|---|---|---|
| 6,795,896 B1 * | 9/2004 | Hart ...................... | G06F 1/3275 713/324 |
| 2006/0075192 A1 * | 4/2006 | Golden ................. | G06F 12/126 711/170 |
| 2008/0104324 A1 | 5/2008 | Raghuvanshi | |
| 2010/0185821 A1 | 7/2010 | Paver et al. | |
| 2013/0346683 A1 * | 12/2013 | Walker ................ | G06F 12/0804 711/E12.024 |
| 2014/0189411 A1 | 7/2014 | Kanchana et al. | |
| 2015/0309939 A1 | 10/2015 | Sadoughi-Yarandi et al. | |
| 2017/0300418 A1 * | 10/2017 | Reed ..................... | G06F 12/128 |
| 2020/0341536 A1 | 10/2020 | Waugh | |

* cited by examiner

Primary Examiner — Stefan Stoynov
(74) Attorney, Agent, or Firm — Volpe Koenig

(57) ABSTRACT

A technique for operating a cache is disclosed. The technique includes in response to a power down trigger that indicates that the cache effectiveness is considered to be low, powering down the cache.

20 Claims, 6 Drawing Sheets

DYNAMIC CACHE BYPASS FOR POWER SAVINGS

BACKGROUND

Caches improve performance by storing copies of data considered likely to be accessed again in the future into a low latency cache memory. Improvements to cache technologies are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for operating a cache is disclosed. The technique includes in response to a power down trigger that indicates that the cache effectiveness is considered to be low, powering down the cache.

Figure 1:
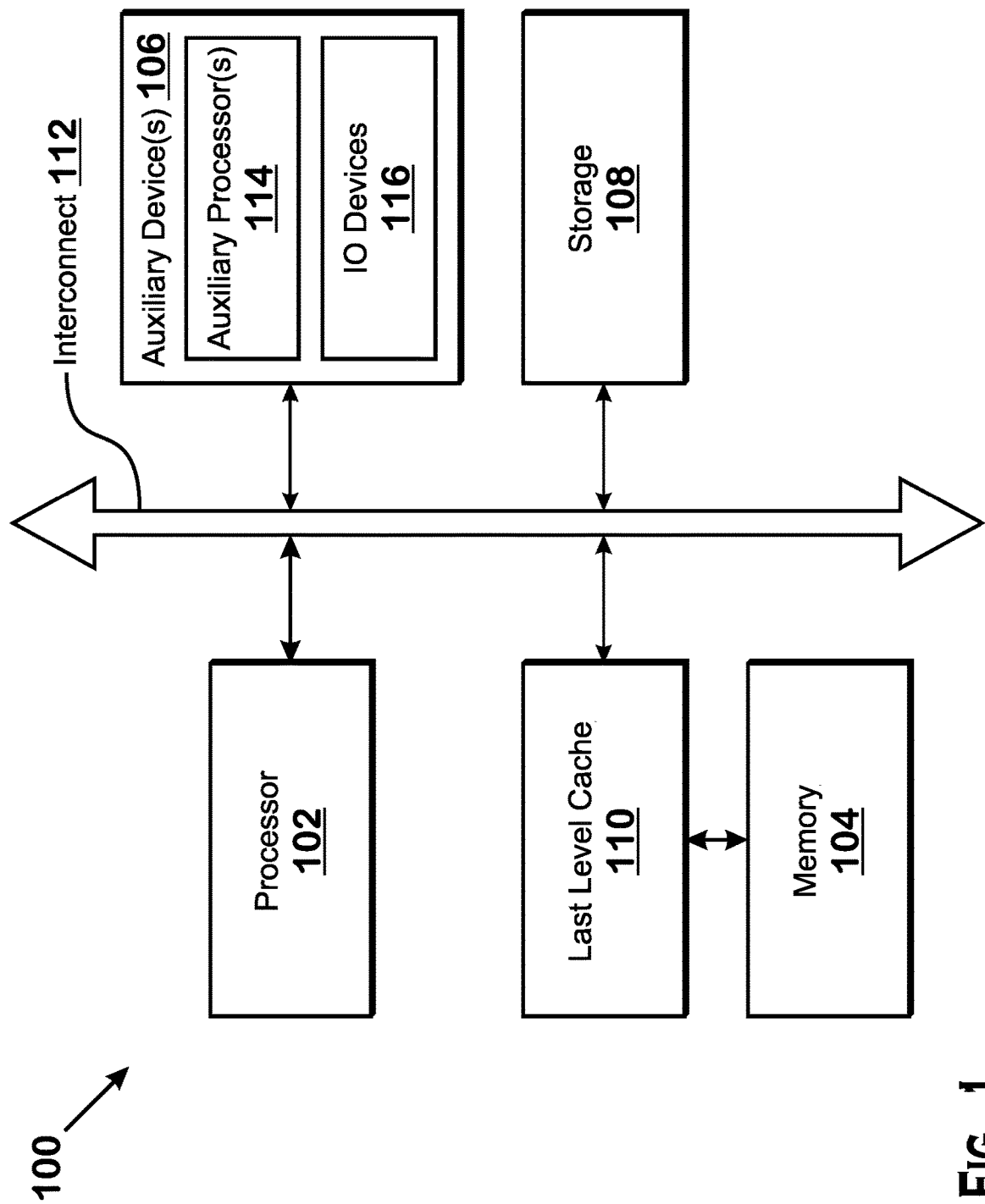
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, a storage 108, and a last level cache ("LLC") 110. An interconnect 112, which can be a bus, a combination of buses, and/or any other communication component, communicatively links the one or more processors 102, the memory 104, the one or more auxiliary devices 106, the storage 108, and the last level cache 110.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more IO devices 116 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

The last level cache 110 acts as a shared cache for the various components of the device 100, such as the processor 102 and the various auxiliary devices 106. In some implementations, there other caches within the device 100. For example, in some examples, the processor 102 includes a cache hierarchy including different levels such as levels 1 and 2. In some examples, each such cache level is specific to a particular logical division of the processor 102, such as a processor core, or a processor chip, die, or package. In some examples, the hierarchy includes other types of caches as well. In various examples, one or more of the auxiliary devices 106 includes one or more caches.

The last level cache 110 is "last level" in the sense that such a cache is the last cache that the device 100 attempts to service a memory access request from before servicing that request from the memory 104 itself. For example, if a processor 102 accesses data that is not stored in any of the cache levels of the processor 102, then the processor exports the memory access request to be satisfied by the last level cache 110. The last level cache 110 determines whether the requested data is stored in the last level cache 110. If the data is within the last level cache 110, the last level cache 110 services the request by providing the requested data from the last level cache 110. If the data is not within the last level cache 110, the device 100 services the request from the memory 104. As can be seen, in some implementations, the last level cache 110 acts as a final cache level before the memory 104, which helps to reduce the overall amount of memory access latency for accesses to the memory 104.

Although the last level cache 110 can provide certain benefits, such as improving access latency for frequently accessed data or for close-together data, there are situations in which the last level cache 110 does not provide benefit, or provides little benefit. In such situations, the power consumed by operating the last level cache 110 can be considered wasted.

Thus, the present disclosure provides techniques for powering the last level cache 110 down in situations in which the last level cache 110 provides little to no benefit (the last level cache 110 has "low cache effectiveness"). In general, according to these techniques, in response to a power down trigger, the last level cache 110 powers down. Memory access transactions that would be serviced from data within the last level cache 110 are instead serviced directly by the memory 104. For example, when the last level cache 110 is powered up, in the event that a memory access request fails in a cache that is at a lower level than the last level cache 110 (such as within the processor 102 or another component), the last level cache 110 checks whether the appropriate data is in the last level cache 110. If that data is present, then the last level cache 110 provides that data to the requestor from within the last level cache 110. When the last level cache 110 is powered down, and another unit requests access to data not stored in a lower level cache than the last level cache 110, the last level cache 110 fetches the data from memory 104 and provides that data to the requestor. The last level cache 110 does not check whether such data is stored within the last level cache 110 when the last level cache 110 is powered down.

Note that a statement that the last level cache 110 is "powered down" means that some or all of the data banks are powered down. However, it is still possible for a cache controller of the last level cache 110 to perform operations such as conveying data and memory access requests between the last level cache 110 and the memory 104. In other examples, the last level cache 110 being powered down means that all circuitry of the last level cache 110 is powered down. In such instances, the actions stated herein as being performed by the last level cache 110 are performed by other entities, such as part of the memory 104 (e.g., a memory controller) or by a separate unit not within the last level cache 110.

As stated above, the last level cache 110 powers down in response to a power down trigger. In some examples, the power down trigger includes a sufficient number of entities that are serviced by the last level cache 110 being powered down. In some examples, the sufficient number is at least a threshold number of entities. In some examples, the device 100 going into a low power mode is the power down trigger. In some examples, a power down trigger occurs when a sufficient number of devices including the processor 102 and one or more auxiliary devices 106 are powered down. In some examples, a sufficient number of devices includes the all clients of the last level cache 110 (for example, the processor 102 and all auxiliary devices 106). Thus, in such examples, the power down trigger occurs when all clients of the last level cache 110 are powered down. In some examples, "powered down" means being inactive or idle. In some examples, an operating system, application, or other software, executes one or more instructions that instructs the device to enter a low power mode. In some such examples, entering this low power mode is the power down trigger. In some examples, the power down trigger includes any action that results in the device 100, or a system-on-chip of the device 100 being brought to a low power state. In different implementations, the power down trigger is any combination of lowered power states of any of the elements of the device 100.

In other examples, the power down trigger occurs when an access pattern in the last level cache 110 indicates that the last level cache 110 provides low benefit to the device 100. In some examples, the last level cache 110 or another entity such as the processor 102, a memory controller coupled to the last level cache 110, or some other entity, tracks misses and/or hits within the last level cache 110. In some examples, the power down trigger occurs when the miss rate in the last level cache 110 is too high or the hit rate in the last level cache 110 is too low. In some examples, the miss rate is the percentage of misses in the last level cache 110 as compared with the total number of access requests to the last level cache 110. In some examples, the hit rate is the percentage of hits in the last level cache 110 as compared with the total number of access requests to the last level cache 110. A miss is an access request to the last level cache 110 for which the result is that the requested data is not within the last level cache 110. A hit is an access request for which the requested data is within the last level cache 110. In some examples, the miss rate being too high occurs where the miss rate is above a threshold deemed to be too high. In some examples, the hit rate being too low occurs where the hit rate is below a threshold deemed to be too low. An access request is a request from another entity (e.g., the processor 102 or an auxiliary device 106) to access memory. In some examples, an access request is a request to read from or write to a memory address. In some examples, this request occurs because a miss occurs in all caches at a lower level in the cache hierarchy than the last level cache 110.

Figure 2:
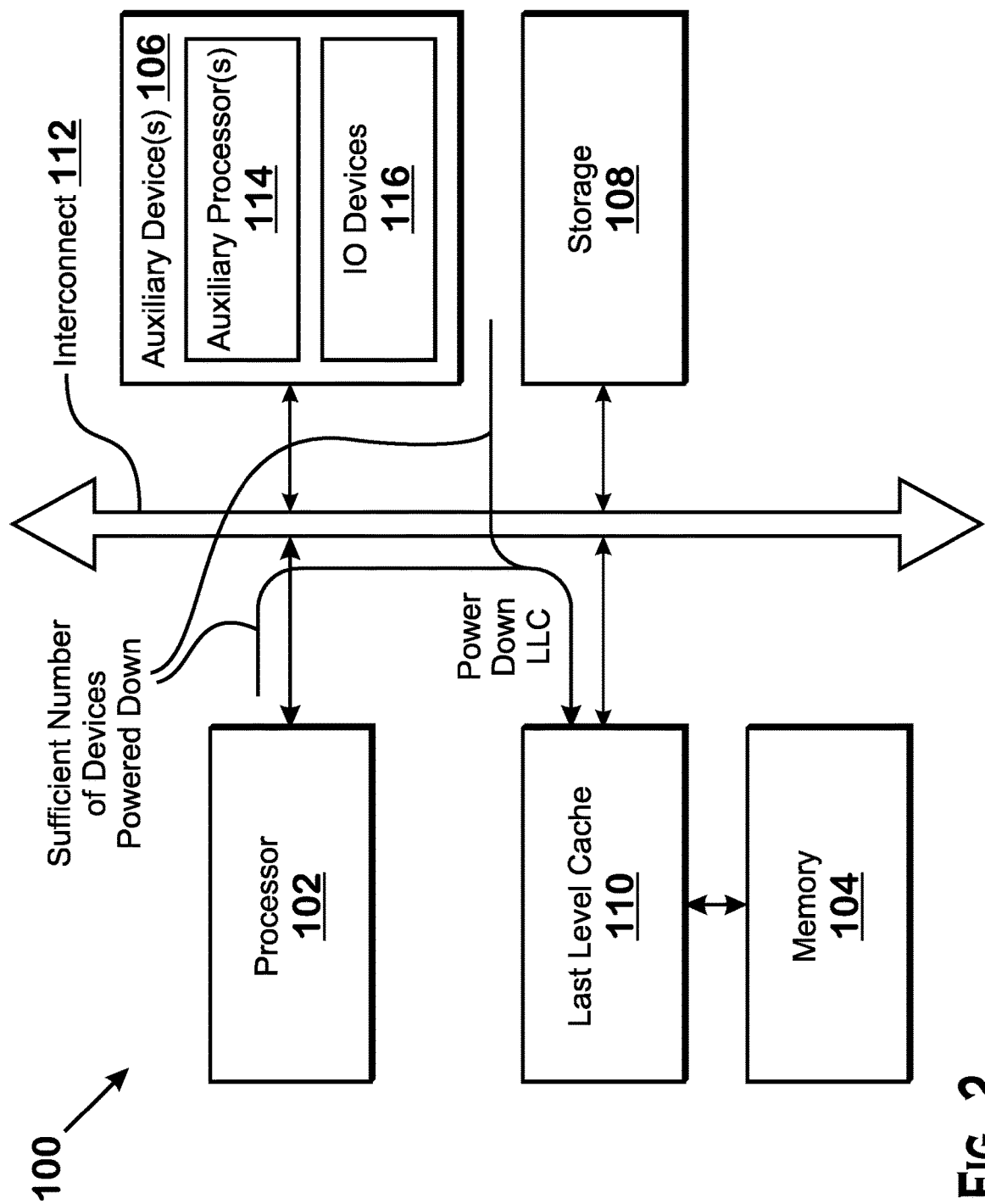
FIGS. 2 and 3 illustrate operations for powering down a last level cache in response to a power down trigger, according to examples.
Figure 3:
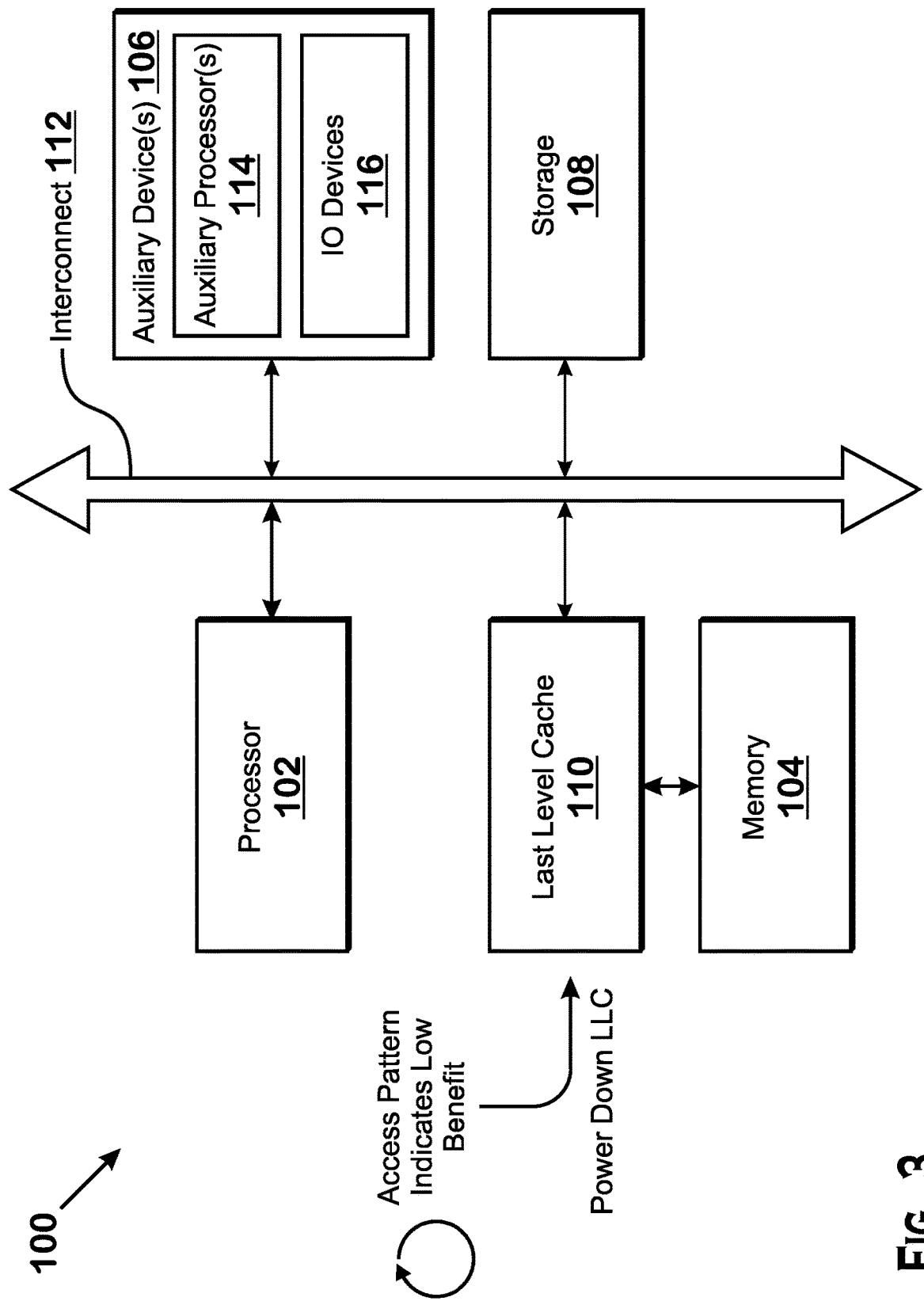

FIGS. 2 and 3 illustrate operations for powering down the last level cache 110 in response to a power down trigger. In FIG. 2, the power down trigger is that a sufficient number of devices (e.g., the processor 102 and/or one or more auxiliary devices 106) are powered down. As described above, any or all of these devices may be powered down for any reason, such as in response to a request by software such as an operating system, application, driver, or other software executing on the processor 102 or other device. In FIG. 3, the power down trigger is that an access pattern of the last level cache 110 indicates that there is little or no benefit for having the last level cache 110 powered on. There are a variety of possible workload types that at least sometimes do not benefit from the last level cache 100. Some examples include workloads that do not exhibit a great degree of spatial and/or temporal memory access locality. Spatial memory access locality means that that memory accesses are made to memory addresses that are close together. Such access patterns benefit from the last level cache 110 because misses result in cache lines being placed into the last level cache 110. Thus if a subsequent access request is near to a first access request that cause a miss, it is likely that the subsequent access will be to the same cache line, which is already in the cache. Temporal memory access locality means that memory accesses are made close together in time. If two accesses are made to the same cache line close together in time, then it is likely that the subsequent access will hit in the cache. The longer it takes to re-access the same cache line, the more likely it will be that the cache line has been removed from the cache due, for example, to an eviction.

In some implementations, the last level cache 110 uses the power down trigger of FIG. 2 (processor 102 and/or auxiliary devices 106 power down), but not the power down trigger of FIG. 3 (access pattern to the last level cache 110 causes the power down). In other implementations, the last level cache 110 uses the power down trigger of FIG. 3 but not the power down trigger of FIG. 2. In other implementations, the last level cache 110 uses both the power down trigger of FIG. 2 and the power down trigger of FIG. 3. In some implementations, the last level cache 110 operates in a first mode in which the last level cache 110 uses the power down trigger of FIG. 2 but not the power down trigger of FIG. 3 and subsequently switches to a second mode in which the last level cache 110 uses the power down trigger of FIG. 3 but not the power down trigger of FIG. 2. In some implementations, the last level cache 110 operates in a third mode in which the last level cache 110 uses both the power down trigger of FIG. 2 and the power down trigger of FIG. 3. In some implementations, the last level cache 110 operates in any of the first, second, or third modes. In some examples, the last level cache 110 switches between the first, second, and third modes.

Figure 4B:
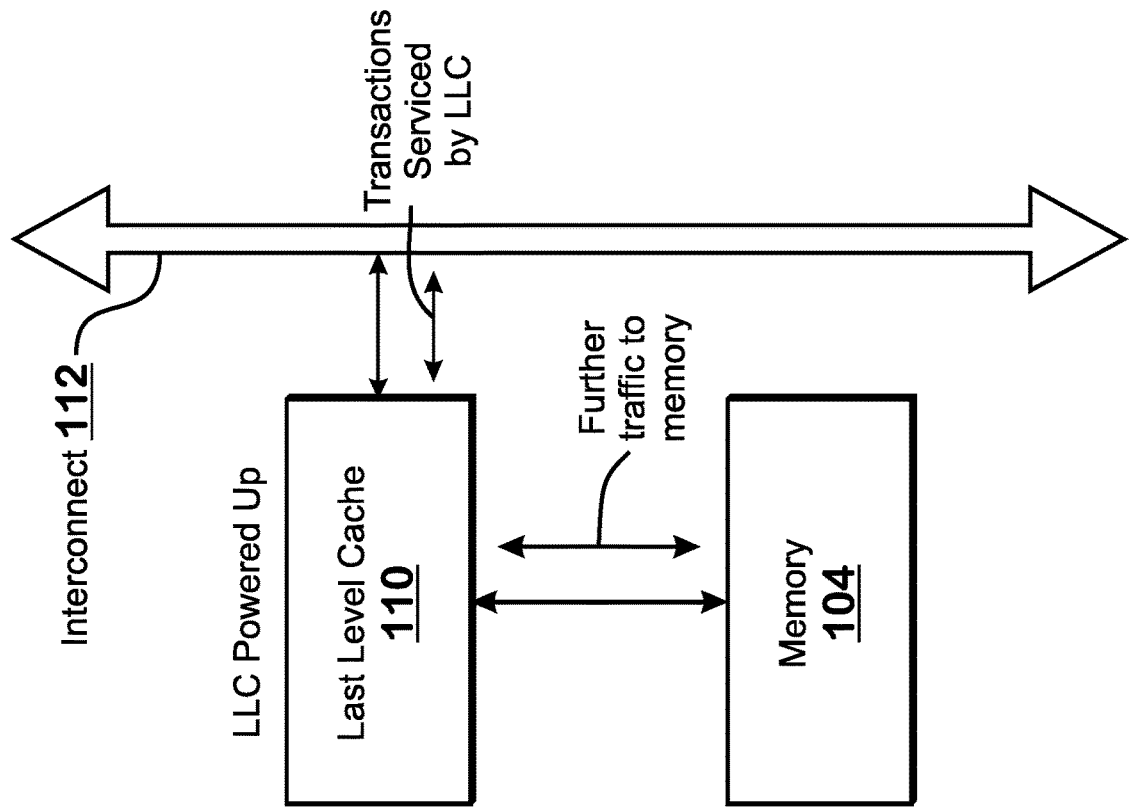
FIGS. 4A and 4B illustrate operations of the computing device when a last level cache is powered down and when the last level cache is powered up, according to examples.
Figure 4A:
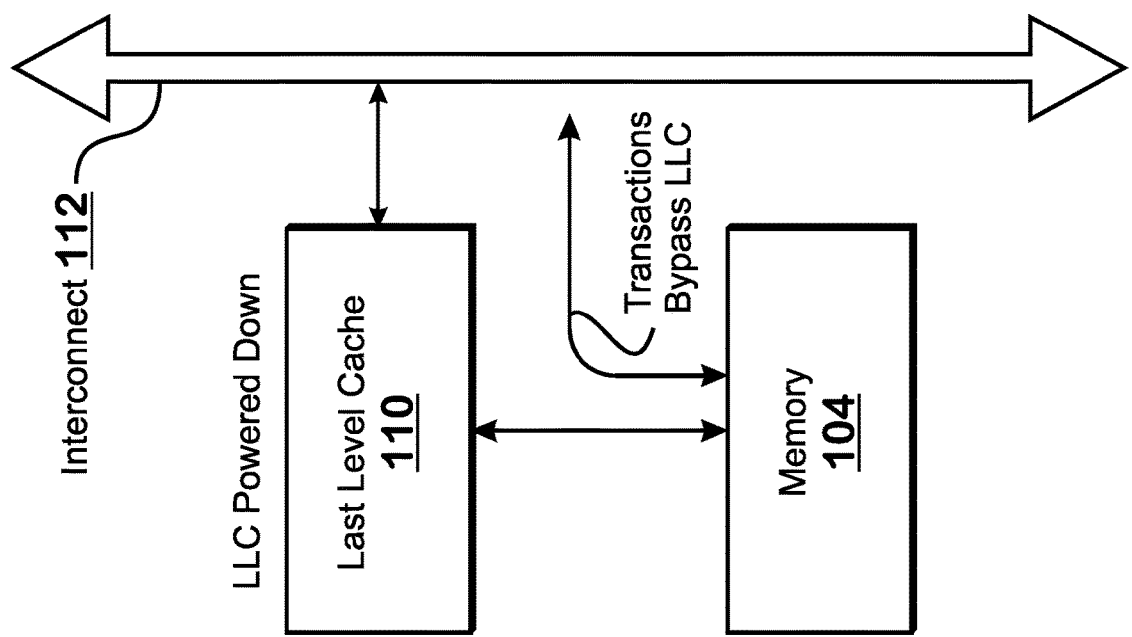

FIGS. 4A and 4B illustrate operations of the device 100 when the last level cache 110 is powered down (4A) and when the last level cache 110 is powered up (4B). In FIG. 4A, in the situation that the last level cache 110 is powered down, the last level cache 110 does not provide responses to memory access requests from data within the last level cache 110. The last level cache 110 is bypassed and transactions that would be serviced by the last level cache 110 are instead serviced directly by the memory 104. In some examples, the last level cache 110 is completely powered down and no component of the last level cache 110 handles memory access transactions. In other examples, a portion of the last level cache 110 is powered down, but a portion of the last level cache 110 remains powered up. In an example, one or more data banks of the last level cache 110 are powered down and one or more control circuits (such as a cache controller) remain powered. In some examples, the one or more control circuits treat all received memory access requests as misses and forward such requests to the memory 104. In such examples, the one or more control circuits do not access data banks of the last level cache 110 as those data banks are powered down.

FIG. 4B illustrates the device 100 in a mode in which the last level cache 110 is powered. In this mode, the last level cache 110 services transactions received from other components. It is possible that servicing some such transactions require communication between the last level cache 110 and memory 104. For example, in the event of a miss in the last level cache 110, the last level cache 110 fetches the cache line for which the miss occurred from the memory 104. In another example, where a dirty cache line is evicted from the last level cache 110, the last level cache 110 transmits the cache line to the memory 104 for being written.

As described elsewhere herein, in response to a power down trigger, the device 100 powers down the last level cache 110. FIGS. 5A-5D illustrate techniques for powering down the last level cache 110, according to an example. In these figures, the last level cache 110 includes a plurality of cache lines 508, each of which includes at least data 504 and state 506. For cache lines whose state is dirty, the last level cache 110 flushes that cache line to the memory 104. This flush copies the contents of the cache line to memory. A cache line is dirty if the cache line is modified as compared with the copy stored in memory 104.

Flushing the entire last level cache 110 takes a fair amount of time, so it is possible for the last level cache 110 to continue servicing memory requests while powering down. A power-down walker 502 walks through the cache lines and flushes the cache lines to memory 104. For cache lines that have already been flushed, such cache lines have an invalid state and thus cannot be used to service memory access requests. However, cache lines that have not yet been flushed can be used to service memory access requests. For read requests that hit on a cache line that has not yet been reached by the power-down walker 502 (and is thus not invalid), such requests are serviced by providing the data within the cache line as a response to the request. For write requests that hit on a cache line that has not yet been reached by the power-down walker 502 (and is thus not invalid), such requests are serviced by modifying the data within that cache line. If the cache line is not marked as dirty prior to servicing that write request, that cache line is marked as dirty. In some examples, the last level cache 110 flushes that cache line to the memory 104 when the power-down walker 502 arrives at that cache line 508. In other examples, the last level cache 110 flushes that cache line immediately upon performing the write, regardless of the position of the power-down walker 502, which then results in that cache line becoming invalid in the last level cache 110. In the event that a miss occurs for a memory access request while the last level cache 110 is powering down, the last level cache 110 passes that memory access request to the memory 104. The last level cache 110 does not allocate cache lines into the last level cache 110 during power down. In other words, if a memory access request misses in the last level cache 110 while the last level cache 110 is powering down, then the last level cache 110 does not fetch the associated cache line from the memory 104 into the last level cache 110. Instead, the last level cache 110 passes the request through to the memory 104.

Figure 5A:
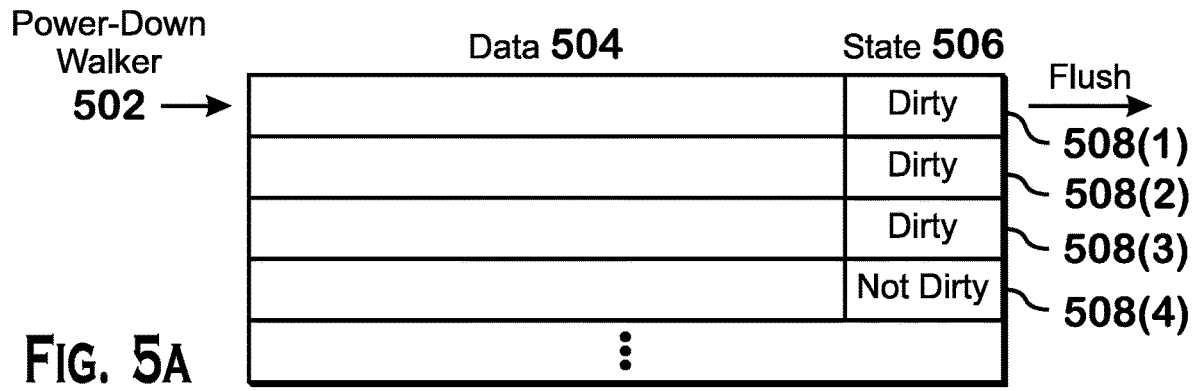
FIGS. 5A-5D illustrate techniques for powering down a last level cache, according to an example.
Figure 5B:
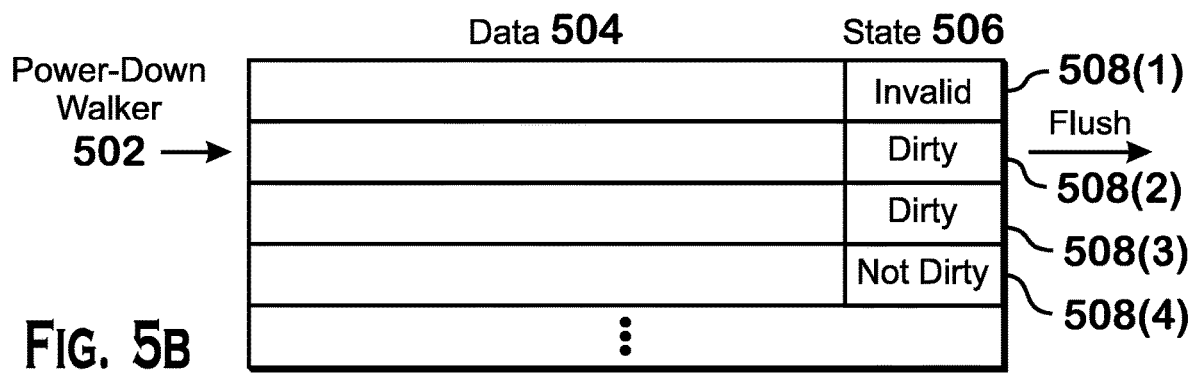
Figure 5C:
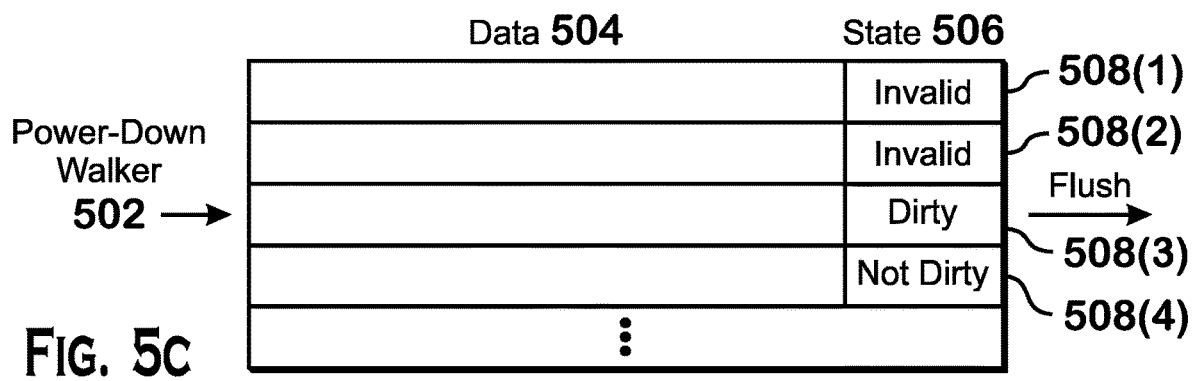
Figure 5D:
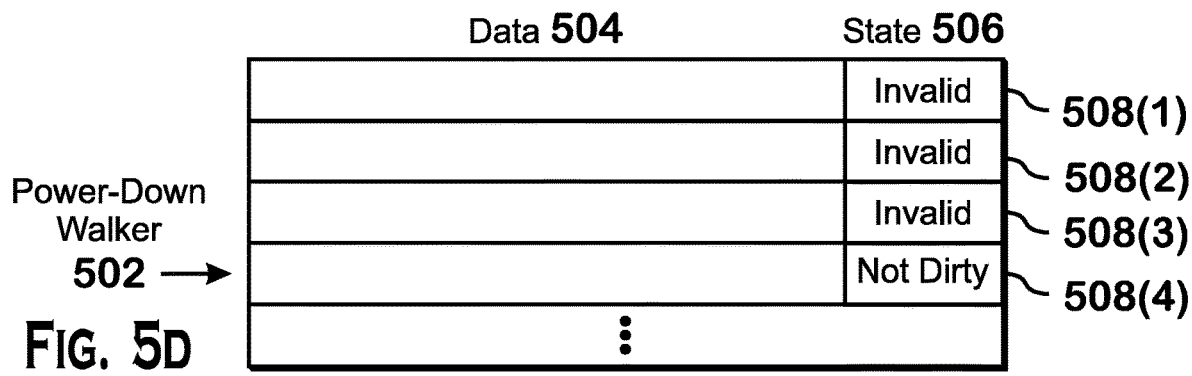

FIGS. 5A-5D illustrate an example sequence of operations for powering down the last level cache 110. In FIG. 5A, the power-down walker 502 is flushing cache line 508(1). The lines past cache line 508(1) (508(2), 508(3), and 508(4)) are valid. Any such line could service incoming requests. In FIG. 5B, the power-down walker 502 has invalidated cache line 508(1) and is flushing cache line 508(2). Cache lines 508(3) and 508(4) could service incoming requests, but cache line 508(1) could not service an incoming request. In FIG. 5C, the power-down walker 502 has proceeded to cache line 508(3). The power-down walker 502 flushes the contents of cache line 508(3) to the memory 104 and invalidates the cache line 508(3). In FIG. 5D, the power-down walker 502 walks to cache line 508(4), but since that cache line is not dirty, the power-down walker 502 does not flush that cache line. However, the power-down walker 502 does invalidate that cache line.

When the last level cache 110 is operating in the power-down mode, and the device 100 detects a power up trigger, the device causes the last level cache 110 to power back up. In some examples, such as where the power down trigger that caused the last level cache 110 to power down is that a sufficient number of entities are powered down, the power up trigger is that at least some of those entities are powered up. In some examples the power up trigger is that all of those entities are powered up. In some examples, where the power down trigger is that an access pattern of the last level cache 110 indicates that the last level cache 110 is not providing sufficient benefit (such as where the miss rate of the last level cache 110 is too high or the hit rate of the last level cache 110 is too low), the power up trigger is detecting that the device 100 is executing with substantially different workload characteristics as when the last level cache 110 is initially powered down. In other words, in some examples, in the situation that the device 100 powers down the last level cache 110 as a result of the last level cache 110 not providing sufficient benefit, the device 100 powers the last level cache 110 back up in response to detecting that the workload characteristics have changed. A change in workload characteristics is an indication that it is possible for the last level cache 110 to again provide substantial benefit to operation of the device 100. For example, if the last level cache 110 is powered down due to not providing sufficient benefit for a first workload, then when the workload characteristics change, it is possible that the last level cache 110 could provide sufficient benefit to the operations of the device that result in the new workload characteristics. Put more simply, even if the last level cache 110 is not providing benefit for a first workload, it is possible that the last level cache 110 will provide benefit for a second workload. A change in workload characteristics is a hint that a new workload could be executing on the device 100, and that the last level cache 110 should be powered back on to provide benefit for that new workload. It is possible for the last level cache 110 to be powered down again in the event that the last level cache 110 does not provide sufficient benefit for this new workload.

There are various ways in which the device 100 could detect a change in workload as a power up trigger for the last level cache 110. In one example, a change in resource utilization is the power up trigger. In various examples, a change in resource utilization is a change in the amount of memory used, or a change in the load on the processor 102. In another example, the power up trigger is that there is a change in which application has user focus. An application has user focus when a user is actively interacting with the application (for example, a web browser has user focus when a user is browsing a web page and providing mouse clicks and keyboard input to the web browser). A change in which application has user focus is an indication that it is likely that workload has changed. Another power up trigger is that a particular auxiliary device 106 goes from low to high utilization or from high to low utilization. In some examples, going from low to high utilization means that the utilization of an auxiliary device 106 goes above a threshold. In some examples, going from high to low utilization means that the utilization of an auxiliary device 106 goes below a threshold. In some examples, utilization of an auxiliary device means the amount of work being performed on the auxiliary device as compared with the total amount of work that could be performed on the auxiliary device. In some examples, an auxiliary device 106 is a video decoder that can handle decode in parallel four different streams of video at a very high resolution with high image settings, and an example of low utilization would be decoding one stream at a low resolution with low image settings. In another example, low utilization means that the video decoder is not active at all. A change in utilization of an auxiliary device is a hint that the device 100 is performing a different workload and thus that the last level cache 110 may be useful for such new workload. Any other change in operational characteristics of the device 100 could be a power up trigger.

Once a power up trigger is detected, the device 100 powers up the last level cache 110. In some examples, an initialization sequence is required after powering up the cache and before the cache can start being used. In some examples, powering up the last level cache 110 includes powering up the powered down banks and beginning to operate normally as a cache (e.g., servicing requests from other entities in the device 100, which includes fetching cache lines from the memory 104 in response to misses, and placing those cache lines into the last level cache 110).

Figure 6:
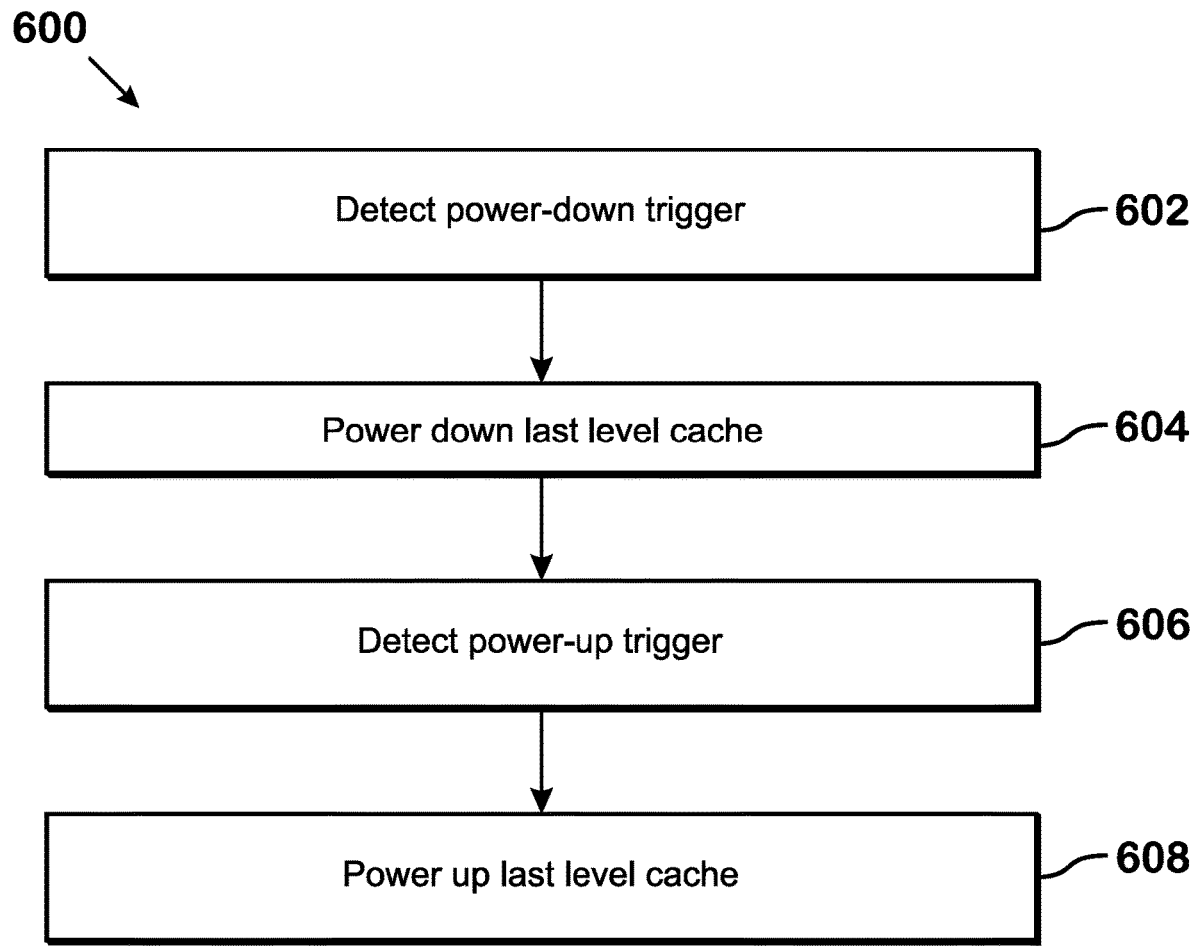
FIG. 6 is a method for operating a last level cache, according to an example.

FIG. 6 is a method 600 for operating a last level cache 110, according to an example. Although described with respect to the system of FIGS. 1-5D, those of skill in the art will recognize that any system configured to perform the steps of the method 600 in any technically feasible order falls within the scope of the present disclosure.

At step 602, the device 100 detects a power-down trigger. The power-down trigger is any of the power-down triggers described herein, such as a sufficient number of components of the device 100 being powered down, or such as detecting an access pattern for the last level cache 110 that indicates that operation of the last level cache 110 is not providing significant benefit.

At step 604, in response to the power-down trigger, the device 100 powers down the last level cache. In some examples, this power down occurs as described elsewhere herein, including with respect to FIGS. 5A-5D.

At step 606, the device 100 detects a power-up trigger. In various examples, the power-up trigger is one of the power-up triggers described elsewhere herein. At step 608, the device 100 powers up the last level cache 110 in response to the power-up trigger. In various examples, powering up the last level cache 110 includes bringing the components of the last level cache 110 to an operable state, allowing the last level cache 110 to again service memory access requests.

The elements in the figures are embodied as, where appropriate, software executing on a processor, a fixed-function processor, a programmable processor, or a combination thereof. The processor 102, last level cache 110, interconnect 112, memory 104, storage 108, and various auxiliary devices 106 include at least some hardware circuitry and, in some implementations, include software executing on a processor within that component or within another component. Certain elements of the last level cache 110 are illustrated in FIGS. 5A-5D. The cache lines 508 represent portions of the memory banks of the last level cache 110 sized to store cache-lines. The data 504 and state 506 are portions of those cache lines 508 designed to store data or state.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for operating a cache, the method comprising:

in response to a power down trigger that indicates that the cache effectiveness is low, powering down the cache; and wherein the power down trigger that indicates that the cache effectiveness is low comprises an access pattern that includes a miss rate in the cache being above a threshold.

2. The method of claim 1, further comprising:
powering the cache back on in response to a power-up trigger.

3. The method of claim 2, wherein the power-up trigger includes one or more components of a device being powered up, wherein the device includes the cache.

4. The method of claim 2, wherein the power-up trigger includes a device that includes the cache having a substantial change to operating characteristics of the cache.

5. The method of claim 1, wherein the power down trigger comprises one or more components of a device being powered down, wherein the device includes the cache.

6. The method of claim 1, wherein the access pattern includes a hit rate in the cache being below a threshold.

7. The method of claim 1, wherein powering down the cache includes flushing lines of the cache indicated as being dirty.

8. A system, comprising:
a cache; and
a processor configured to execute instructions that store data in the cache,
wherein the cache is configured to power down in response to a power down trigger that indicates that the cache effectiveness is low,
wherein the power down trigger that indicates that the cache effectiveness is low comprises an access pattern that includes a miss rate in the cache being above a threshold.

9. The system of claim 8, wherein the cache is configured to power on in response to a power-up trigger.

10. The system of claim 9, wherein the power-up trigger includes one or more components of a device being powered up, wherein the device includes the cache.

11. The system of claim 9, wherein the power-up trigger includes a device that includes the cache having a substantial change to operating characteristics of the cache.

12. The system of claim 8, wherein power down trigger comprises one or more components of a device being powered down, wherein the device includes the cache.

13. The system of claim 8, wherein the access pattern includes a hit rate in the cache being below a threshold.

14. The system of claim 8, wherein powering down the cache includes flushing lines of the cache indicated as being dirty.

15. The system of claim 8, wherein the cache is configured to power on in response to a power-up trigger.

16. The system of claim 8, wherein power down trigger comprises one or more components of a device being powered down, wherein the device includes the cache.

17. A system comprising:
a processor;
a plurality of auxiliary devices; and
a cache, wherein the processor and the plurality of auxiliary devices are clients of the cache, wherein the cache is configured to power down in response to a power down trigger that indicates that the cache effectiveness is low,
wherein the power down trigger that indicates that the cache effectiveness is low comprises an access pattern that includes a miss rate in the cache being above a threshold.

18. The system of claim 17, wherein the cache is further configured to:
power back on in response to a power-up trigger.

19. The system of claim 18, wherein the power-up trigger includes one or more components of a device being powered up, wherein the device includes the cache.

20. The system of claim 17, wherein the access pattern includes a hit rate in the cache being below a threshold.

\* \* \* \* \*